R. B. OWENS.
GOVERNING MECHANISM.
APPLICATION FILED MAY 7, 1907.
953,285.
Patented Mar. 29, 1910.
2 SHEETS—SHEET 1.
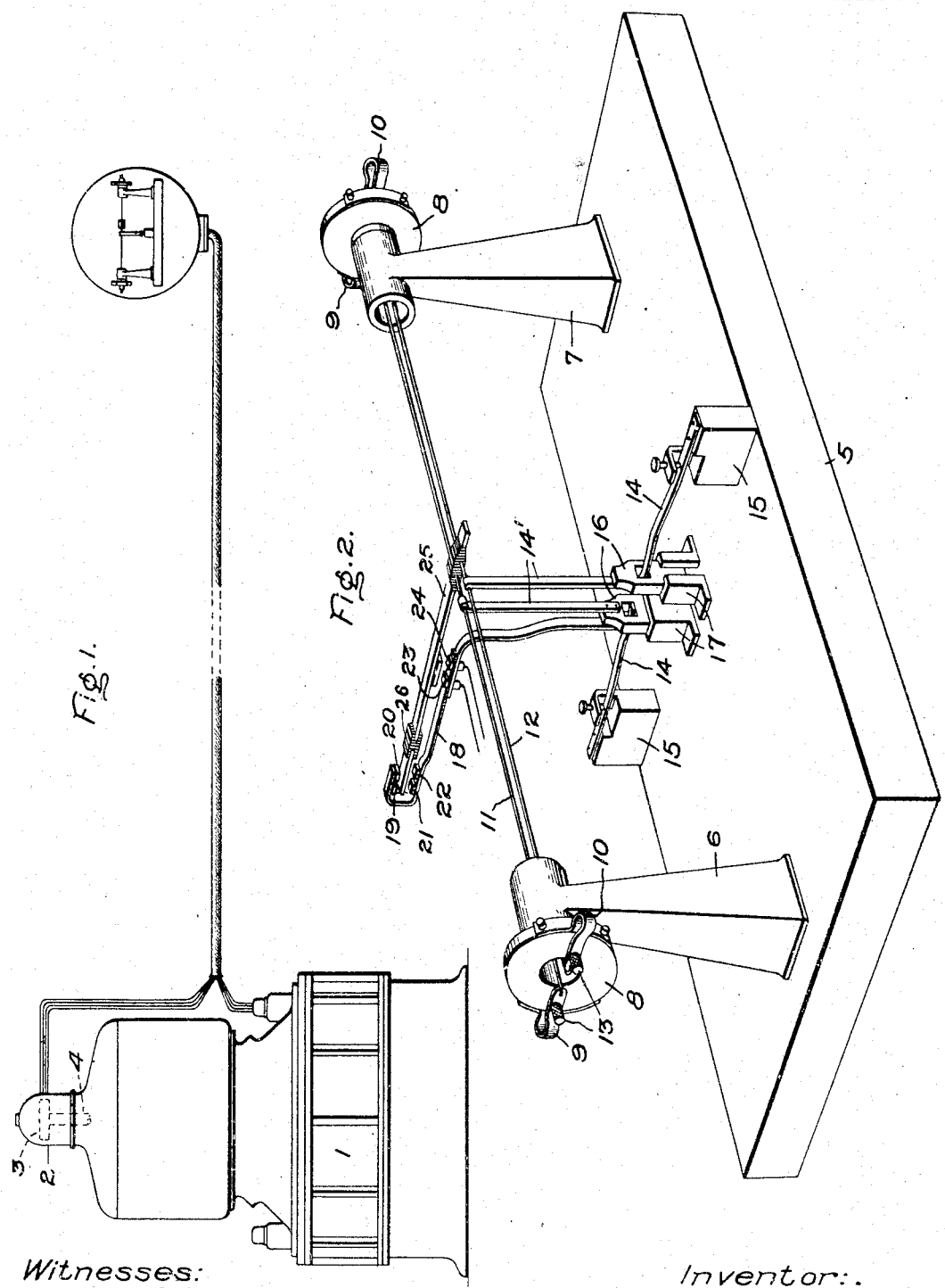
Witnesses:
Edward Williams Jr.
Alex. F. MacDonald.
Inventor:
Robert B. Owens,
by Albert G. Davis
Att'y.

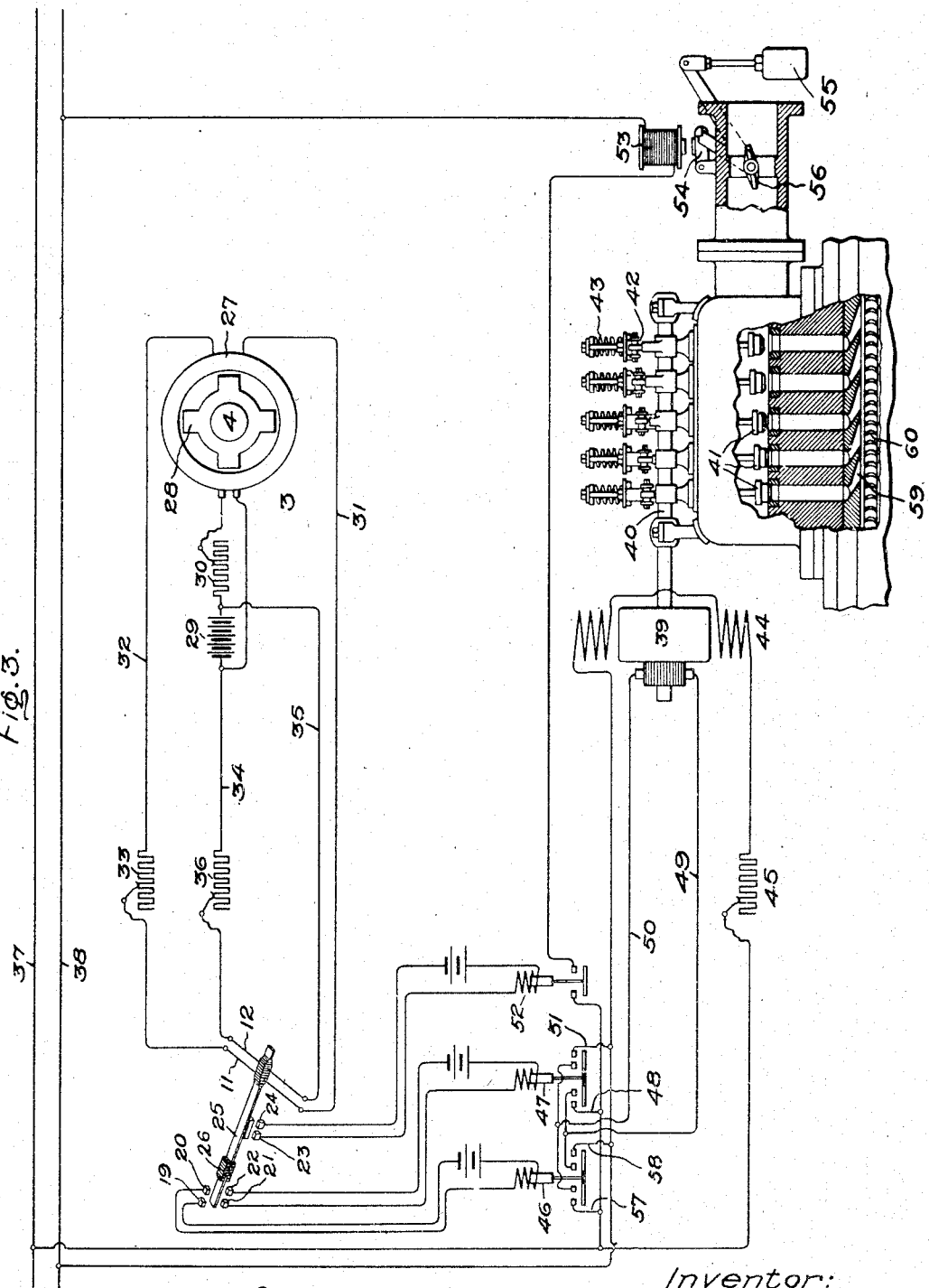

UNITED STATES PATENT OFFICE.

ROBERT B. OWENS, OF MONTREAL, QUEBEC, CANADA, ASSIGNOR TO GENERAL ELECTRIC COMPANY, A CORPORATION OF NEW YORK.

GOVERNING MECHANISM.

953,285.   Specification of Letters Patent.   Patented Mar. 29, 1910.

Application filed May 7, 1907. Serial No. 372,324.

*To all whom it may concern:*

Be it known that I, ROBERT B. OWENS, a citizen of the United States, residing at Montreal, Province of Quebec, Canada, have invented certain new and useful Improvements in Governing Mechanisms, of which the following is a specification.

The present invention relates to governing mechanisms and more especially to those intended for controlling the admission of motive fluid to elastic fluid turbines, although it is not limited thereto.

The object of the invention is to provide a governing mechanism of improved construction.

In carrying out my invention as applied, for example, to elastic fluid turbines, I mount on the turbine shaft or on a shaft driven thereby, the rotating member of a small electric generator, the stationary member being in coöperative relation with respect thereto, as for example, surrounding the same. By preference, the rotating member is composed of a mass of iron having suitable polar projections, and is unwound so as to avoid the necessity of slip-rings between it and an external circuit which always require more or less attention on the part of the station attendant. By avoiding the use of any winding on the rotating member, the latter can be of very simple construction, and may be made rugged enough to withstand centrifugal strains.

The stationary member is provided with a suitable field winding excited from a source, such, for example, as a storage battery, and also an armature winding. By preference the field magnet works on the lower portion of the saturation curve so that the generator will be more sensitive in its operation than would be the case if it worked on the upper portion of said curve. Such a construction also results in a low first cost and requires little or no attention from the station attendant. It avoids the complications of a speed-governor having centrifugal weights, springs, etc., and also the lag commonly found in such a device owing to the friction of the parts moving with respect to one another.

As the speed of the turbine changes with changes in load, the potential and the amount of current induced in the armature winding of the stationary member will correspondingly change. I utilize the change in current flow to actuate a device which, in turn, controls the action of a regulator which may be the valve or valves employed to regulate the admission of motive fluid to a turbine, or the flow of the fluid through its stages or both.

The device acted upon by the current instead of being located on the machine itself is preferably situated at a point remote therefrom where it is out of the influence of the machine being governed, and is readily accessible. For example, it may be mounted on the switch-board where it will be under the observation of the switch-board attendant and where it can be adjusted by simple means and without interfering with the operation of the turbine or other machine being governed.

In the preferred form of the device, two hot-wire units are provided. In the simplest form of the invention each of these units comprises a single wire, but where greater power or sensitiveness is required, each may be made of a plurality of wires and arranged to work directly or through levers or other transmitting devices. One of these units is connected to the armature winding of the generator referred to and may be termed the active unit; the other is connected to the same battery or other source of supply which excites the field magnet of said generator, and may be termed the compensating unit. By reason of this construction any change in potential of the battery or other source furnishing the exciting current will have the same effect on both units, and so also will any change in the room temperature.

In using the term "hot-wire units," it is not to be understood that they ever get very hot, for such is not the case. They are of such character, however, that they will expand and contract a moderate amount with comparatively small changes in current strength. Various kinds of wire can be used in their manufacture, the cross-section, length and resistance being governed by the amount of current normally flowing through them.

It is desirable to keep the temperature of the units as low as possible at all times consistent with satisfactory operation so that the alternate heating and cooling will not injure them.

Mounted on or actuated by the said hot-wire units is a contact device arranged to make or break the circuit of an electric motor, the latter being connected directly or through suitable gearing with a shaft that actuates the valve or valves of the turbine, or the governing mechanism of any other machine being governed. Stationary contacts are provided which are connected to the windings of the motor, and are so arranged with respect to the hot-wire actuated device that the motor will be caused to revolve in the proper direction to accomplish the desired regulation. The said device and contacts form a relay, and the current for actuating the motor does not therefore have to flow through the hot-wire units or the device carried thereby.

The hot-wire units and the contact device actuated thereby are inclosed in a small casing mounted on the switch-board, and connected by conductors with the generator located on the turbine and also with the switches controlling the motor and the emergency valve mechanism, the latter acting when, for any reason, the speed of the turbine exceeds a predetermined amount. The circuit wires may be inclosed in metal tubes to protect them against injury. This arrangement does away with the mechanical complications of existing structures, and keeps the thermal element of the system away from the heat radiating from the turbine.

The wire or wires forming the hot-wire units are kept taut by suitable springs or equivalent devices, and since the position of the units may change bodily by a small amount with changes in current strength of the battery or other exciting source, and also with changes in room temperature, I mount the stationary contacts on a support or supports in such manner that their positions are changed with changes in position of the contact device.

In the accompanying drawings, which illustrate one of the embodiments of the invention, Figure 1 is a view showing a turbine fitted with my improved governing mechanism; Fig. 2 is a perspective view, made in a more or less diagrammatic manner, of the hot-wire units and contact device; and Fig. 3 is a diagram of the circuits, also showing the valve mechanism.

1 represents a turbine of any suitable construction or type, the one illustrated being a Curtis turbine. Mounted in the dome 2 thereof is a small electric generator 3 which is driven by the turbine shaft 4. Mounted on the switch-board or other suitable support distant from the turbine are the hot-wire units.

Referring to Fig. 2, 5 represents a base upon which are mounted two upright standards 6 and 7, each having a disk of insulation 8 and two flat springs 9 and 10 connected to the hot-wire units 11 and 12. The tension of each spring can be adjusted by a screw 13. The disks and standards are bored to permit the hot-wire units to pass through them without contact, thereby leaving them free to expand and contract. Preferably, but not necessarily, the units 11 and 12 occupy horizontal positions so that all parts of the units are subjected to the same temperature conditions. The units are kept taut by flat springs 14 connected thereto by straps 14' and adjustably mounted in supports 15. Each spring engages a head 16 mounted to move vertically in a guide 17. To the left hand head is secured a frame 18 that supports three insulated sets of contacts 19, 20; 21, 22; and 23, 24. The first pair of contacts is connected in circuit in such manner that when closed, the valve mechanism will increase the supply of steam or other motive fluid to the turbine, or energy of any sort to the controlled device in event of its being used in other connections. The second pair of connections is arranged when closed to give the opposite effect, and the third pair is arranged to close the circuit of a magnet that releases the emergency valve, and permits it to close by gravity, a spring or fluid pressure, as desired. Mounted on the said units in a manner to be moved thereby is a contact device or arm 25. When in the upper position it closes the upper pair of contacts, when in the lower normal position, the lower pair of contacts, when in an abnormally low position the emergency contacts, and when midway the circuits are open and the valve mechanism is at rest. This contact device is divided into two parts electrically by the body of insulation 26. There is a certain amount of flexibility in the contact device so that upon failure of the valve mechanism to act quickly enough, the emergency contacts 23 and 24 will be closed.

It is apparent that for a very small change in length of the active unit 11 there will be a considerable movement of the free end of the contact device, the compensating unit 12 acting as a fulcrum. The changes in length of the units due to changes in strength of the exciting battery are small and take place gradually over a considerable period of time, while a change due to a change in speed of the turbine is a relatively sudden one. It is evident that instead of using a spring, a weight or equivalent means may be employed for keeping the units taut under changes in current strength.

Referring to Fig. 3. 27 represents the stationary member of the generator 3 and 28 the rotor, mounted on the turbine shaft 4. The stationary member is provided with a field winding excited by the battery 29 which includes an adjustable resistance 30 for varying the excitation. It is also provided with an armature winding connected by the wires 31 and 32 with the active hot-wire unit 11. In the circuit is included an adjustable resistance 33. The battery is also connected by the conductors 34 and 35 with the compensating unit 12 so that changes in its strength act on both the generator and the compensating unit. The circuit also contains an adjustable resistance 36 whereby the effect of the battery on the compensating unit can be changed.

37 and 38 represent the mains of any suitable source of supply of a moderate voltage for furnishing the necessary power to operate the motor 39, the latter being mechanically connected directly or indirectly to the cam shaft 40 which actuates the valves 41 one after the other. These valves are attached to levers 42 and are raised by the cams and closed by the outside springs 43. The field winding 44 of the motor is connected to the circuit of the supply mains and includes an adjustable resistance 45. The armature circuit is normally open and is controlled by magnetically actuated switches 46 and 47, and the circuit of these magnets is under the control of the active hot-wire unit through the contact device 25. When the device is in the position shown the armature circuit is open. Assuming that the speed of the turbine increases there will be an increase of current in the armature circuit of the generator 3 which will increase the temperature and length of the hot-wire unit 11 by a certain amount, and since the compensating unit 12 remains fixed in length under such a condition it acts as a fulcrum, and the spring 14 will pull the unit 11 down, and at the same time, move the contact device 25, and close the circuit of the relay magnet 47. When thus energized, its core is raised, and the contacts controlled thereby are closed and the circuit will be from the wire 37 to wire 48, thence to wire 49 and the armature of the motor, returning by the wires 50 and 51 to the main 38. This will cause the motor to rotate toward the observer and permit one valve after the other to close until the proper amount of motive fluid is being supplied to the turbine. When the speed of the turbine returns to normal the flow of current through the active unit will become normal and the motor circuit will be broken. Assuming that, for any reason, the motor fails to operate or does not respond quickly enough to specified conditions, the contact device 25 will close the circuit of the contacts 23, 24 and energize the magnet 52. This closes the circuit of the magnet 53 and the latter attracts its armature and raises the latch 54 and permits the weight 55 to fall and close the emergency valve 56, and thus cut off further supply of fluid to the turbine.

Assuming that the speed of the turbine falls, the amount of current flowing through the hot-wire of the unit 11 is decreased which causes the same to shorten, and in so doing raise the outer end of the contact device and close the circuit of the contacts 19 and 20, thus energizing the coil of the switch 46. When this switch is closed, current flows from the main 37 and wire 57 to the wire 50 and the armature of the motor, returning by the wires 49 and 58 to the main 38. It will be observed that under this condition the direction of rotation of the motor is opposite that previously described, and one or more of the valves will be opened to admit more fluid to the turbine until the speed again becomes normal and the flow of current through the active unit becomes normal.

In the construction shown, each of the valves 41 controls the passage of fluid to an expanding nozzle 59 which, in turn, discharges fluid against the wheel buckets 60. If desired, the valve may control more than a single nozzle or nozzle section.

I have shown the regulating mechanism of the turbine as being actuated by an electric motor, since this is a very simple and effective arrangement, but it is evident that other means may be employed for this purpose. The construction described requires electric switches for controlling the motor circuits, and so they have been illustrated, but in event of a different form of motor being employed, or a different form of regulating mechanism, either for a turbine or other apparatus, it is within the scope of my invention to make the necessary changes or modifications in the controlling member actuated by the hot-wire units.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a governing mechanism, the combination of an apparatus to which energy is supplied, an electric generator moving with said apparatus, a source of current for exciting the generator, a means sensitive to the current produced by the generator, a regulator for the apparatus responsive to said means, and a second means sensitive to current flowing through said source which as the excitation varies modifies the action of the first means on the regulator.

2. In a governing mechanism, the combination of a prime mover, an electric generator driven thereby whose field-magnet works on the lower end of the saturation curve, a source of exciting current for the generator, a regulator for the prime mover which is primarily responsive to current from the generator and secondarily to variations in current strength of the exciting source.

3. In a governing mechanism, the combination of a prime mover, an electric generator driven thereby whose field-magnet works on the lower end of the saturation curve, a source of exciting current for the generator, a means responsive to temperature changes caused by variations in the current produced by the generator, a means responsive to temperature changes due to the current from the exciting source, and a regulator whose position is determined primarily by the generator current and secondarily by the exciting current.

4. In a governing mechanism, the combination of an apparatus to which energy is supplied, an electric generator driven by said apparatus, a source of excitation for the generator, a means responsive to temperature changes for regulating the apparatus, and a compensating device coöperating with said means whose effective action varies with variations in the source of excitation.

5. In a governing mechanism, the combination of an apparatus to which energy is supplied, an electric generator moving with said apparatus, a source of supply for exciting said generator, a means responsive to changes in strength of the current from the generator for regulating the supply of energy to said apparatus, and a means for compensating for changes in output of the exciting source.

6. In a governing mechanism, the combination of an apparatus to which energy is supplied, an electric generator driven by said apparatus, a source of supply for exciting said generator, a hot-wire unit responding to changes in output of the generator, a second hot-wire unit which changes in length with changes in excitation of the generator, and a regulator for said apparatus which is controlled by said units.

7. In a governing mechanism, the combination of an apparatus to which energy is supplied, an electric generator driven by said apparatus, a hot-wire unit receiving current from the generator and expanding and contracting with changes in current delivered thereby, a contact device moved by said unit, contacts adapted to be engaged by said device, a support for the contacts, a means for moving the support to compensate for a change in the normal length of the unit, and a regulator for said apparatus that is under the control of said contact device.

8. In a governing mechanism, the combination of an apparatus to which energy is supplied, an electric generator moving with said apparatus, a hot-wire unit included in the generator circuit, a compensating unit, a source of current supply which is common to the field of the generator and the compensating unit, a regulator for said apparatus, and a means actuated by said units for controlling the action of said regulator.

9. In a governing mechanism, the combination of an apparatus to which energy is supplied, an electric generator moving with said apparatus, the field of which has a low field excitation, a hot-wire unit receiving current from the generator and changing in length with changes in current flow, a compensating unit, a source of current supply common to the field of the generator and the compensating unit, a member carried by both units, and a regulator for the said apparatus that is under the control of said unit.

10. In a governing mechanism, the combination of an elastic fluid turbine, a generator driven thereby, a valve mechanism for the turbine, a hot-wire unit connected to the generator which changes in length with changes in current flow, a compensating unit also responsive to changes in current flow, and a member acted upon by both units for controlling the valve mechanism.

11. In a governing mechanism, the combination of an apparatus to which energy is supplied, an electric generator moving with the apparatus, a hot-wire unit acted upon by current from the generator, a second hot-wire unit through which the field current of the generator passes, a member supported on and moved by the units, means for keeping the units taut, a regulator for the said apparatus, and a motor for actuating the regulator which moves in response to changes in position of the said member.

12. In combination, a prime mover, a plurality of successively acting valves for regulating the passage of motive fluid therethrough, an electric generator driven by the prime mover, a unit which expands and contracts with changes in current induced in the generator, a compensating unit responsive to changes in current flow in the exciting circuit of the generator, and an actuator for moving the valves successively that is under the control of said units.

13. In a governing mechanism, the combination of a prime mover, an electric generator driven thereby, a source of current for exciting the generator, a means responsive to variations in current delivered by the generator and due to speed changes, a second means responsive to changes in strength of the exciting current, a regulator for the prime mover, and an actuator for the regulator that is primarily controlled by the first-mentioned means and secondarily by the last-mentioned means.

14. In a governing mechanism, the combination of a prime mover, an electric generator driven thereby whose sole purpose is to serve as a speed-responsive device for the prime mover, the field of said generator working on the lower end of the saturation curve, a source of current for exciting the field of the generator, a regulator for the prime mover, a motor for actuating the regulator, and a device governing the motor which is differentially acted upon by current from the generator and the exciting source.

In witness whereof, I have hereunto set my hand this third day of May, 1907.

ROBERT B. OWENS.

Witnesses:
C. W. HARRINGTON,
JOHN BLIZARD.